United States Patent [19]

Benignus et al.

[11] Patent Number: 4,888,771

[45] Date of Patent: Dec. 19, 1989

[54] DIAGNOSTIC CONFIGURATION MANAGEMENT FOR A DATA PROCESSING SYSTEM

[75] Inventors: Douglas M. Benignus, Dime Box; Luke M. Browning, Austin, both of Tex.

[73] Assignee: International Business Machines Corporation, Armonk, N.Y.

[21] Appl. No.: 210,587

[22] Filed: Jun. 23, 1988

[51] Int. Cl.$^4$ .............................................. G06F 11/00
[52] U.S. Cl. ................................... 371/16.1; 371/16.5
[58] Field of Search ....................... 371/15, 16, 17, 18, 371/20, 11; 364/200 MS File, 900 MS File, 300; 324/73 R, 73 AT

[56] References Cited

U.S. PATENT DOCUMENTS 4,606,024  8/1986  Glass ..................................... 371/16
4,649,515  3/1987  Thompson et al. .................. 364/900
4,670,834  6/1987  Byal .................................... 371/16 X

OTHER PUBLICATIONS

IBM Technical Disclosure Bulletin, "Virtual Maintenance Subsystem", vol. 28, No. 12, 5/86, pp. 5506–5509.
IBM Technical Disclosure Bulletin, "Display of Power-On Self-Test Results", vol. 28, No. 5, 10/85, pp. 2265–2266.
IBM Technical Disclosure Bulletin, "Diagnostic Master Rule Base for Expert System", vol. 28, No. 11, 4/86, pp. 5017–5020.
IBM Technical Disclosure Bulletin, "Method for Hardware Error Log Analysis Service Organizations", vol. 29, No. 9, 2/87, pp. 3794–3795.
IBM Technical Disclosure Bulletin, "Loop Power-On-Self-Test Diagnostics", vol. 30, No. 1, 6/87, pp. 193–194.
N. A. Burns et al., "Use of Artificial Intelligence to Diagnose Hardware", IBM RT Personal Computer Technology, #SA23-1057, pp. 35–39.

Primary Examiner—Jerry Smith
Assistant Examiner—Robert W. Beausoliel
Attorney, Agent, or Firm—Marilyn D. Smith

[57] ABSTRACT

The system and method of this invention classifies the options of a data processing system into test levels based upon the dependency of the option to other options within a configuration of the processing system. The test level information for each option is stored in a present configuration list of the options. In addition, prerequisite rule bases are linked to each dependent option in the configuration list. The diagnostic system accesses the test level information and the prerequisite rule base information to determine when to test an option, and the order in which to test options, when isolating a failing option. A failing option can be isolated during a system checkout, a selected option checkout, or by resolving a missing option in the present configuration.

24 Claims, 9 Drawing Sheets

PRESENT CONFIGURATION RECORD

| NAME | TYPE | SRN | FROM SLOT | SLOT | ARB | | |
|------|------|-----|-----------|------|-----|---|---|
| ADAPTER | | | | | TEST LEVEL | IODN | PRE-FROM SLOT |
| | | | | | PRE-SLOT | PRE-TYPE | PRE SRN |
| DEVICE | | | | | | | |
| EXPANSION CARD | 64 | 65 | 0 | 4 | DR6400 | | |
| | | | | | 0 | 16 | |
| RECEIVER CARD | 68 | 69 | 4 | 7 | DR6800 | | |
| | | | | | 1 | 23 | 0 |
| | | | | | 4 | 64 | 65 |
| RS188 | 38 | 35 | 4 | 6 | DR3800 | | |
| | | | | | 2 | 26 | 4 |
| | | | | | 7 | 68 | 69 |

FIG. 5

DIAGNOSTIC CONFIGURATION MANAGEMENT FOR A DATA PROCESSING SYSTEM

BACKGROUND OF THE INVENTION

1. Field of the Invention

This invention relates to data processing systems having a base system unit, optional hardware adapters, and corresponding optional hardware devices attached thereto, and more particularly, to the configuration of a diagnostic system for the data processing system as a whole in its present configuration, and for any one of the optional components, separately.

2. Description of the Related Art

The structure of a typical data processing system, such as the IBM RT PC having an AIX operating system, is shown in FIG. 1. A typical data processing system comprises a system unit 11 having a processor 6, a memory management unit 7 having random access memory (RAM) and read only memory (ROM) 8, and an I/O channel controller 9. Physical devices such as disks 21, hard files 3, keyboards 23, displays 22, and other I/O devices 20 are attachable to the system unit through adapters, either as options or as part of the base processing system provided by the manufacturer.

For more information oh the IBM RT PC and the AIX operating system, the following references are herein incorporated by reference. *AIX Operating System Technical Reference,* Volumes 1 and 2, IBM Corporation, SC23-0808 and SC23-0809. *IBM RT Personal Computer Technology,* IBM Corporation, SA23-1057, 1986.

As a user powers on the processing system, many systems run a power on self test (POST) to check the operability of the basic functions of the hardware, and to determine the configuration of the processing system. The size of memory, and which adapters and devices are attached to the processing system, are all a part of the configuration. The configuration of the machine can be complex, variable, and expandable. The power on self test (POST) can be resident in read only memory 8 or on a diagnostics application program diskette 10, in which case it is referred to as a loadable power on self test (LPOST).

A POST or LPOST is required for each major area of the processing system such as each adapter, each hard file type, diskette type, etc., in the system. As each POST or LPOST is run, a record of the non fatal errors is logged in a POST control block 12. Other information recorded in the POST control block includes the option name (adapter name or device name), the type, and the slot location of the option for the present configuration. When the tests are completed, the information in the control block can be used by any software routine 10 to further diagnose the processing system.

A diagnostic software package 10 allows both operators and service representatives to diagnose the hardware, isolate faulty parts, and replace those parts with new parts. A typical diagnostic software package runs on the machine suspected of having faulty components, and controls and analyzes the results of hardware tests that are run on itself. Everything necessary to bring up the machine and run the diagnostics is diskette resident.

Typically, when a diagnostic software package diagnoses a faulty part, a service request number is displayed to a user which references the faulty part or parts. The recognition and isolation of a set of hardware problems to the fewest number of service request numbers is a problem. With the ever increasing complexity and flexibility of computer configurations, the interdependences between hardware options is ever changing, which makes this problem even more difficult.

Typically, in processing systems known in the art, adapters plugged into the system planar. When an adapter disappeared or failed the diagnostics, the most likely field replaceable unit was either the adapter, the system planar, or both. Expansion units to the original processing systems are becoming more common. An expansion unit allows more adapters to be attached to the system than for which the system was originally designed. Since an adapter can be plugged into an expansion unit, any field replaceable unit associated with the expansion unit could cause an adapter to disappear or fail the diagnostics. For example, the options in an expansion unit are dependent on the operation of the expansion unit, which is dependent upon the operation of an expansion adapter. If the expansion adapter disappears, then the expansion unit and all of the options in the expansion unit will also disappear. However, without further isolating the problem, the service request number would list all of the dependent options as field replaceable units instead of just the expansion adapter.

An architecture of a diagnostic system known in the art utilizes an expert system which takes knowledge encoded as rules, and makes conclusions on the basis of the rules. When the expert system concludes that a particular component is present and needs testing, the rules necessary for the diagnostics of that component can be read in and used in diagnosing machine faults.

In an expert diagnostic system known in the art, option codes were used to define the configuration such that the configuration was viewed as a building block of options. Each option had its own area rule base associated with it. The system checkout component handled an option checkout by calling only the area rule base for that selected option. If the option was dependent on another option, the rule base of the other option had to be included in the rule base of the selected option. In this way, each rule base had to provide additional rules based on how the option could fit into a configuration. Consequently, these rules would have to be changed if the option could later fit into a different configuration a different way.

For example, if an expansion unit were added to a system configuration which allowed options to now be attached to the expansion unit in addition to the system unit, the rule base for each option would have to change to indicate whether the option feature was in the expansion unit or not. The area rule base would then have to be changed to either add additional tests to isolate a problem to the option, to any one of the expansion unit field replaceable units (FRU's), or to the expansion unit. Since several adapters could go into the expansion box, this method would cause all area rule bases for options that could be installed into the expansion unit to be changed to handle the additional field replaceable units. Also, this method would require that the area rule bases be changed each time a new expansion box is added.

SUMMARY OF THE INVENTION

It is therefore an object of this invention to reduce the resource requirements for diagnostic development by allowing diagnostics to be written for individual options independent of where they are located within any given system configuration.

It is a further object of this invention to implement improved diagnostic isolation techniques when diagnosing an individual option.

It is a further object of this invention to reduce the number of field replaceable units which are incorrectly included in service request numbers, thereby reducing the duration of a repair action, and saving service costs.

The system and method of this invention expands the amount of information recorded for each option listed in the configuration record. For each option listed in the configuration record, a test level and a prerequisite rule base for each option is given. A system checkout component processes this information automatically and contains the logic necessary to isolate failing field replaceable units by determining the order in which options are tested. The order in which options are tested depends upon the prerequisite rule base for that option, the test level for an option, and whether a system checkout or an option checkout is being performed.

As a result, the logic for testing an option has been removed from the area rule base for that option and placed at the outermost level of the diagnostics. Only the rules needed to test an option independent of its location within the system configuration are included in the area rule base. The prerequisite rules needed to test an option, which is dependent upon a specific configuration, are linked to that option through the configuration record, and not through the area rule base for that option. This allows the diagnostics to be more flexible for changing system configurations. Otherwise, for each new release of hardware, each area rule base for each option would have to be changed to reflect the latest set of all possible configurations in which the option could be utilized within the system.

A prerequisite rule base is a rule base that should be run before the selected option rule base is run. The use of prerequisite rule bases makes the content of each area rule base more functional. Area rule bases only contain the knowledge that is needed to test an option. They do not contain logic necessary to isolate failing options, nor do they need to understand how an option fits into the system.

The system checkout component determines which prerequisite rule bases to run for a selected option checkout depending upon the information stored in the present configuration record. If the selected option is dependent upon another option, then the system checkout component determines if there are any prerequisite rule bases for the other option, also. This allows an endless number of prerequisite rule bases to be chained together to an option in the configuration table, and tested in the correct order independent of the other rule bases for the other options. Therefore, diagnostic rule bases can be written for individual options independent of where the options are located in the system, and independent from other options which are dependent upon them.

The system and method of this invention provides a system wide view, instead of a building block view, of the configuration by associating system codes with each option. Knowledge of the entire system is used when diagnosing an individual option. The system classification scheme is based on test levels. The present invention defines four test levels, but any other number of test levels could be defined. The configuration classification scheme is flexible, and can be used to represent any type of configuration.

A first test level is assigned to options that extend the functions of the system resources in the system unit. A second test level is assigned to options that are immediately dependent on the first level options in the system unit. A next test level is assigned to those options that are immediately dependent upon an option in a preceding test level.

The above test levels are applied differently to different configurations. The test levels layer the configuration so that diagnostics can isolate defective hardware.

The test levels are checked starting with the lowest level. Options which are dependent upon other options should be placed at a higher level. For example, consider option A and option B. If option A can cause option B to disappear, or option A is required to test option B, then option B should be placed at a higher level than option A. This allows the system to be checked at layers from the inside of the system to the outside options. Diagnostics can be written for individual options independent of where they will be located in the system.

The test levels are put into the present configuration record by the configuration determination modules, and are assigned based on an option's location. The level also indicates an option's dependencies to other options. They are then saved in the past configuration record by the system checkout component.

During a system checkout, the system checkout component checks all options in the lowest level before proceeding to the next highest level. If a problem is found, a service request number is built reflecting all the options that failed at that test level. Only those options, if any, in the next level that are not dependent on the failed options at the lower level are tested next. In a preferred embodiment, the system checkout processing ends at the test level in which a failed option is encountered.

During an option checkout, the system checkout component tests all options having rule bases linked to the selected option through the prerequisite rule bases in the configuration record. Each prerequisite option is checked in order until an option fails.

The system checkout component makes use of both the test level designations and the prerequisite rule bases when it is resolving the disappearance of options. The two classification schemes complement each other. The underlying assumption is that prerequisite rule bases identify all of the lower level options on which an option is dependent.

The missing option resolution proceeds along test levels, verifying the configuration in layers. As each layer is verified, it can be tested. If a device at a higher level disappears, its prerequisite hardware can be tested because the configuration has already been verified for the lower levels. If the user indicates the device is missing, then the system will automatically test the lower level hardware before calling out the missing device. If one of the lower level antecedent hardware devices are defective, it may show up in the configuration, and other options which are dependent upon it may appear to malfunction. The service request number of the antecedent option will be called out, not the service request number of the device.

BRIEF DESCRIPTION OF THE DRAWING

FIG. 5 is a block diagram showing a present configuration record utilized in the system and method of this invention.

DESCRIPTION OF THE PREFERRED EMBODIMENT

Figure 2:
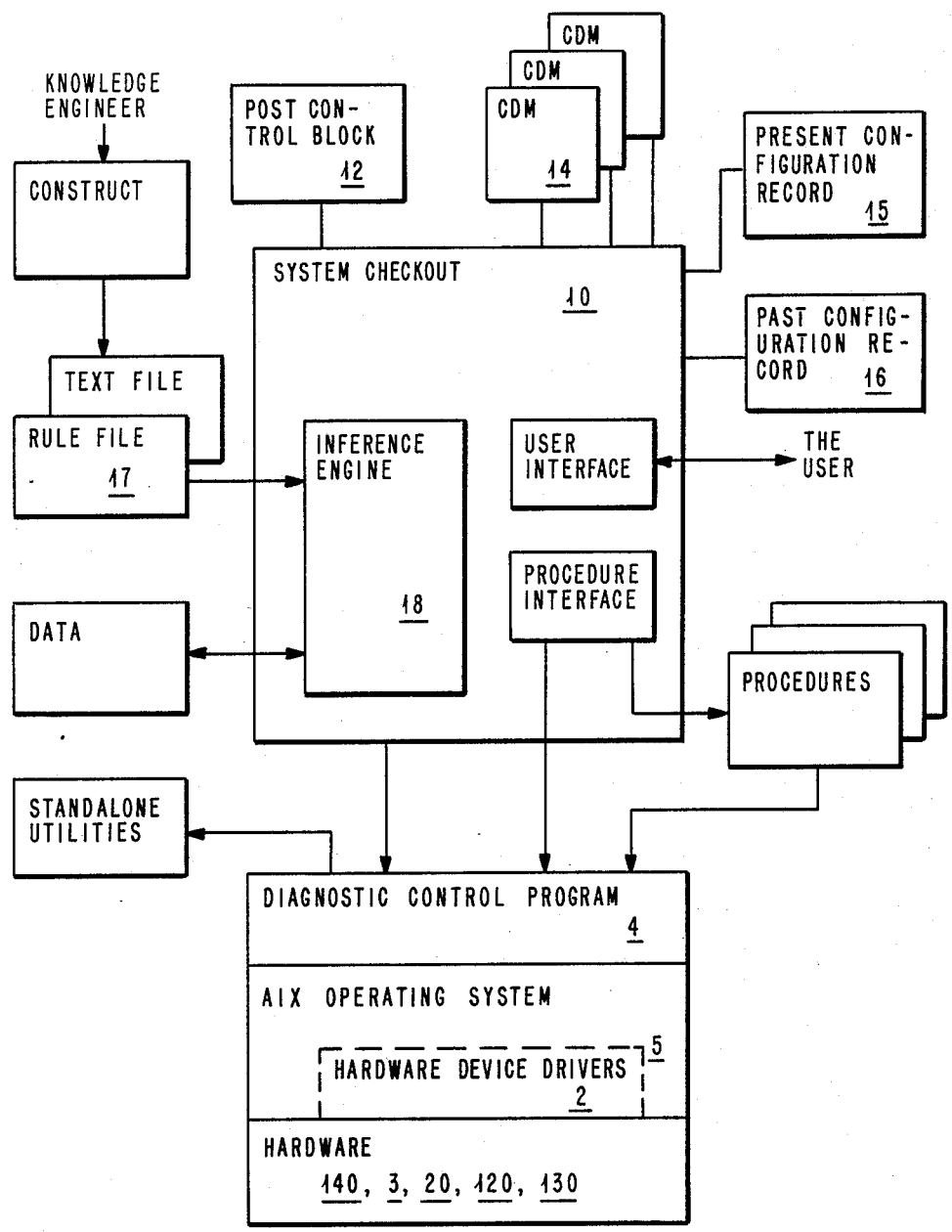
FIG. 2 is a block diagram showing an architecture of the diagnostic system of this invention.

The components of the preferred embodiment are shown in FIG. 2. The diagnostic application 10 has its own operating system, the diagnostic control program 4. The diagnostic control program is a virtual machine which provides an AIX operating system 5 file system and a direct interface to the hardware device drivers 2.

After the POST and LPOST are completed, and before any rule bases are run in the expert system, configuration determination modules 14 are run. The configuration determination modules 14 build the present configuration record 15 based upon the POST control block 12. The information built into the present configuration record 15 includes what area rule base to run for the installed options, whether the option names should be displayed in the diagnostic selection menu, and the test level and prerequisite rule base information as further discussed with reference to FIG. 5. A configuration determination module 14 is required for each major area, such as each adapter type, hard file type, diskette type, etc., in the system.

The system checkout shell 10 presents menus to the user and obtains information about the type of testing to be performed. It calls the inference engine 18 as a subroutine, passing it a list of values to be used in controlling the inference process. The inference engine 18 reads in the rule base 17 and gathers evidence by asking or running procedures. There is an area rule base in the rule base file 17 for each major area, such as each adapter type, hard file type, diskette type, etc., just as there is a configuration determination module for each major area. Based on the results from running the appropriate area rule bases, the system checkout shell concludes goals indicating which parts, if any, are faulty, and returns the list of concluded goals to the system checkout program 10. Goal text in the diagnostic system is in the form of a service request number. This number is used to report the problem to a service organization, or to replace the faulty part.

Figure 1:
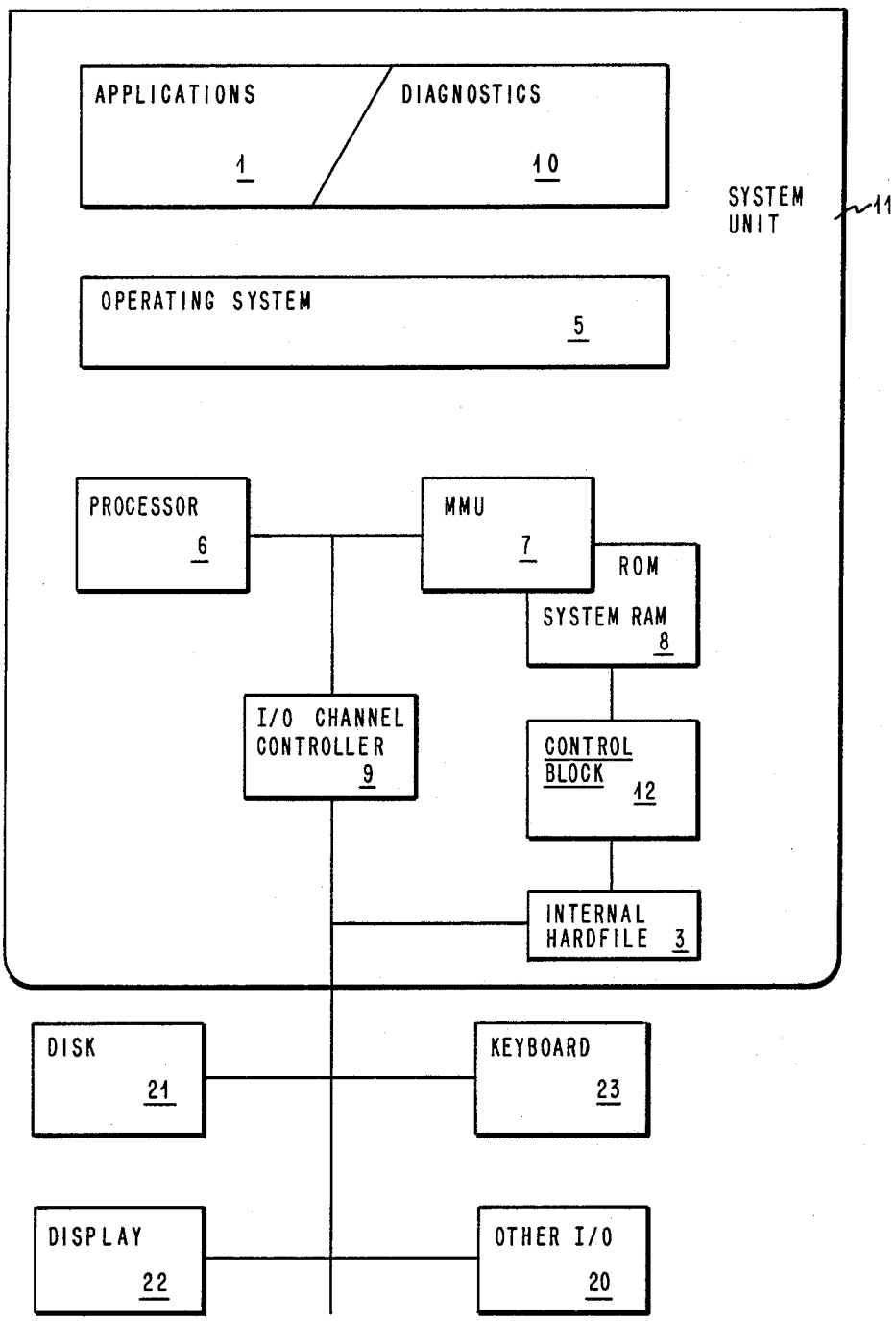
FIG. 1 is a block diagram showing the physical structure of a processing system known in the art.

The system checkout component 10 handles any missing options, and is the controlling program for the area rule bases. The system checkout component 10 first compares the present configuration record 15 with the past configuration record 16 to determine if there are any changes. If there are any missing options, the system checkout component 10 will ask if the option was removed or not. If the option has not been removed, the system checkout component 10 will call the option out as defective via a service request number. If the option has been removed, the system checkout component will delete the option from the past configuration record 16. Once the past configuration record 16 and the present configuration record 15 match, the system checkout component saves the past configuration record 16 on a file 3 (FIG. 1) for use the next time diagnostics are run.

The system checkout component 10 then builds and displays the diagnostic selection menu based on information in the present configuration record 15. Two types of diagnostics can be run via the diagnostic selection menu. They are system checkout and option check outs. System checkout checks all options in the system by running all area rule bases for all options in the system. Option checkouts only check the selected option by running the area rule base for the selected option. When a selection is made, the system checkout component invokes the appropriate area rule bases. When the area rule bases have completed, the system checkout component will interpret the results and display a service request number if needed.

Area rule bases control the running of the option diagnostics. They interface to the user, invoke device drivers and API test units, and interpret device driver and API test unit results, etc. Device drivers interface directly to the hardware, and are controlled by the area rule bases and the API test units. API test units are used to interface between area rule bases and device drivers when the type of test to be run is more appropriately included as an application level module. An area rule base is required for each major area such as each adapter type, hard file type, diskette type, etc., in the system. As new options are provided for a system, new rule bases are added.

The present configuration record 15 contains all of the information needed by the system checkout component 10 to build the selections menus, determine what area rule bases to invoke, what parameters to pass to the area rule bases, and to determine in which order to test the options. The present configuration record 15 is built by the configuration determination modules 14 from information in the POST control block 12 and other sources. An entry in the present configuration record 15 is required for each major option in the system.

The past configuration record 16 contains all of the information needed by the system checkout component 10 to determine what options were in the machine when the diagnostics were last run. The past configuration record 16 is built by the system checkout component 10. It is saved whenever the user indicates that an option has been removed or added. An entry in the past configuration record 16 is required for each major option in the system.

In a preferred embodiment of the system and method of this invention, four test levels are defined for a processing system configuration, and recorded in the configuration record 15 for use by the system checkout component. However, for different configurations, the test levels may vary. In addition, for other embodiments, a different number of test levels may be defined.

In the preferred embodiment, the four test levels are defined as follows. The lowest level, level 0, is used for options in the system unit such as expansion cards, etc. For example, adapters and devices directly attached to the system unit would be assigned level 0. Level 1 and level 2 are used for options outside of the system unit. For example, level 1 is used for options outside of the system unit which extend the functions of the system resources, e.g., planar boards. Any enclosures attached to the system unit would be assigned a level 1, also. Level 2 is used for the options in expansion units. In addition, adapters and devices within enclosures would be assigned to level 2. Level 3 is reserved for portable options such as portable files. Generally, options which are dependent upon other options are placed at a higher level. In addition, there may be a default level which is used to represent options which are exempt from the test level processing. These options would include the portable options since they are designed to be added and deleted from the system.

The four test levels of the preferred embodiment determine which options should be checked for presence in a system configuration, and the order in which the options should be checked during a system checkout. The options in each of the levels are checked starting with the lowest level.

FIGS. 3A and 3B, and FIGS. 3C and 3D show how the test levels are applied to different configurations. The test levels layer the configuration so that diagnostics can isolate the defective hardware.

Figure 3A:
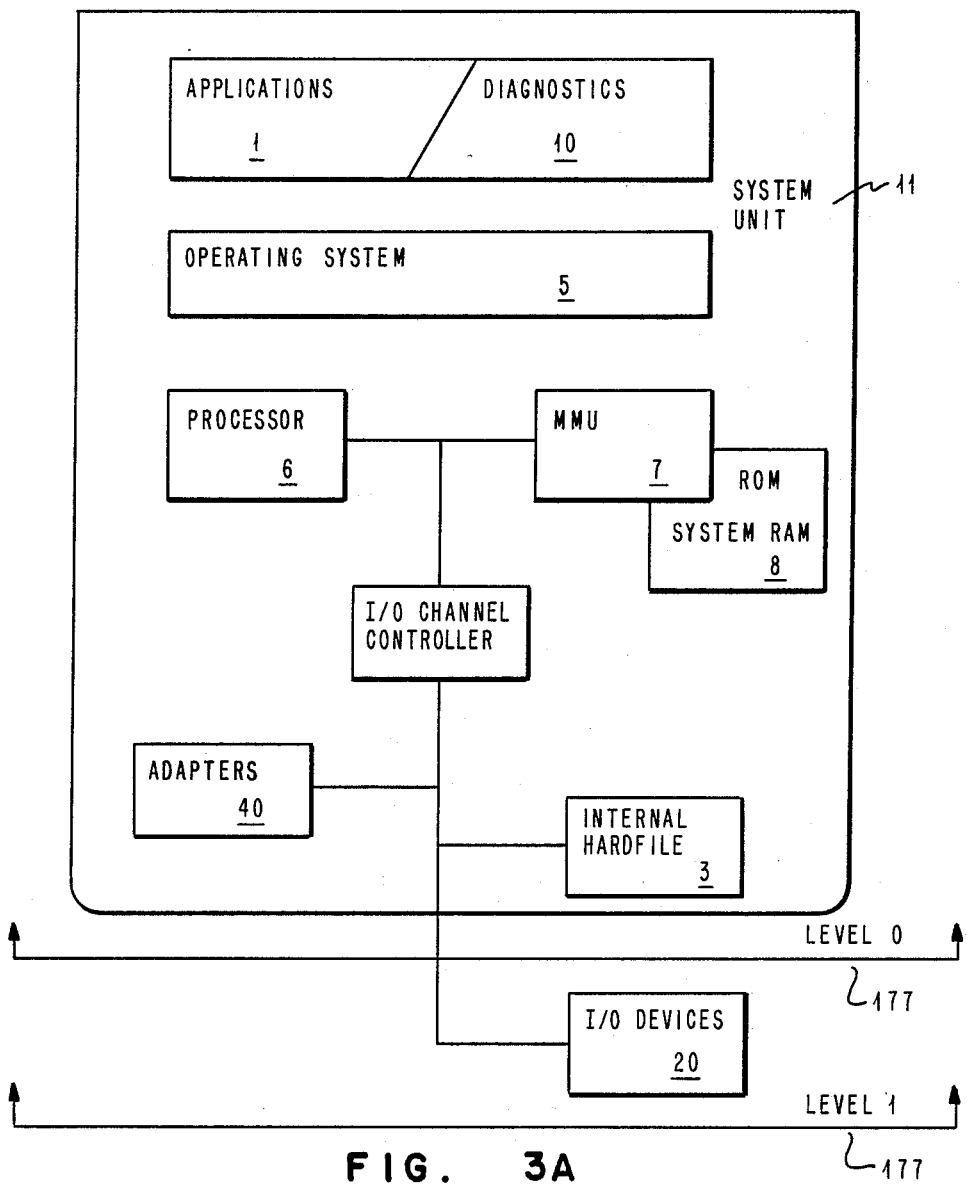
FIG. 3A and FIG. 3B illustrate one test level classification scheme for a system having a configuration as shown.
Figure 3B:
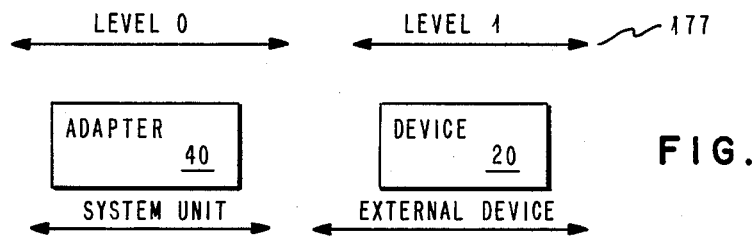

For example, with reference to FIG. 3A and FIG. 3B, consider the configuration where option A is a megapel display adapter 40, and option B is a megapel display 20. If the option A adapter 40 can cause the option B display 20 to disappear, or is needed to test option B, then the option B megapel display 20 should be placed at a higher level than option A. This allows the processing system to be checked at layers from the inside to the outside, and allows diagnostics to be written for individual options independent of where they are located within the configuration of the system.

Figure 3C:
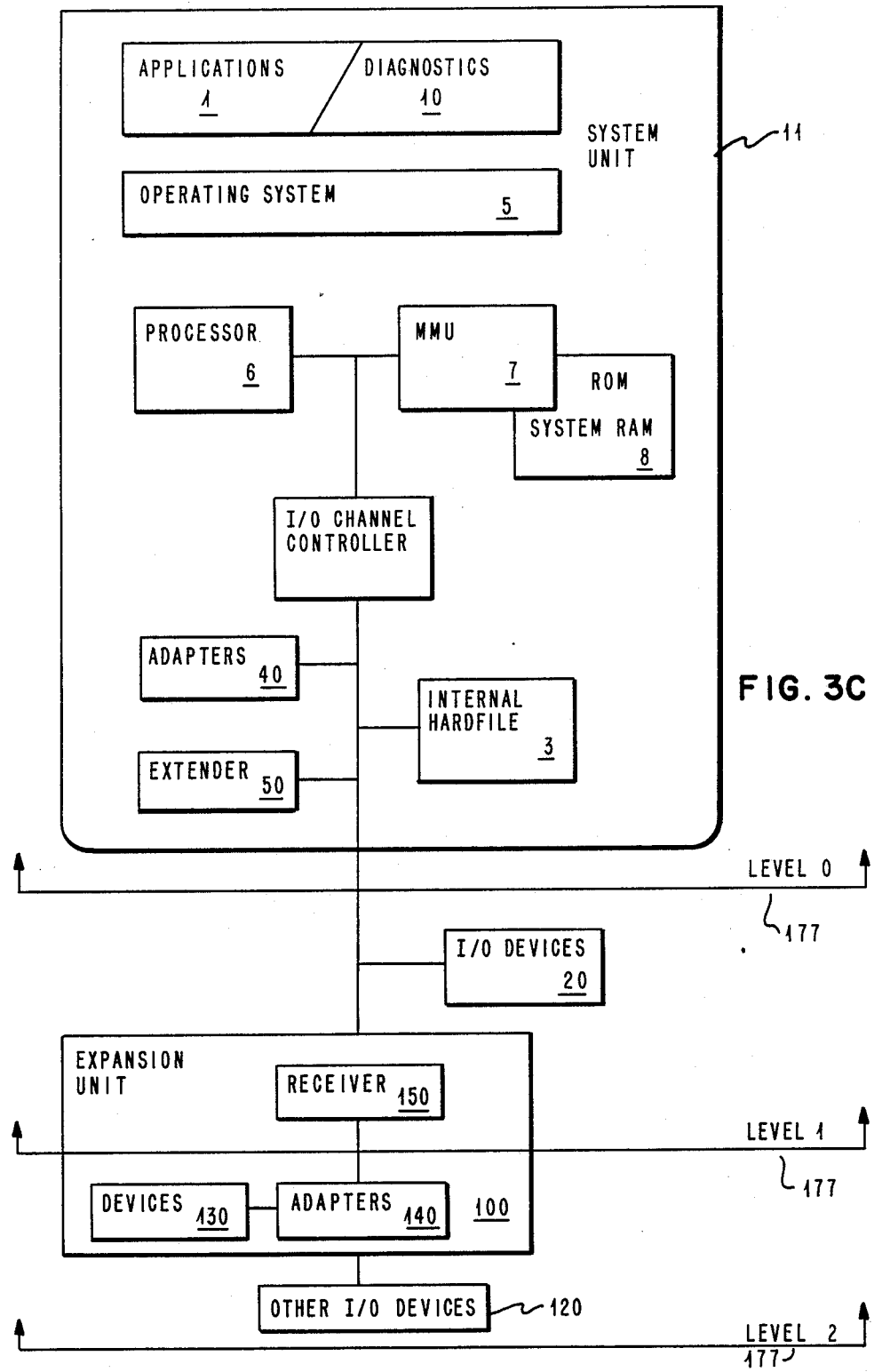
FIG. 3C and FIG. 3D illustrates another test level classification scheme for a system having a different configuration as shown.
Figure 3D:
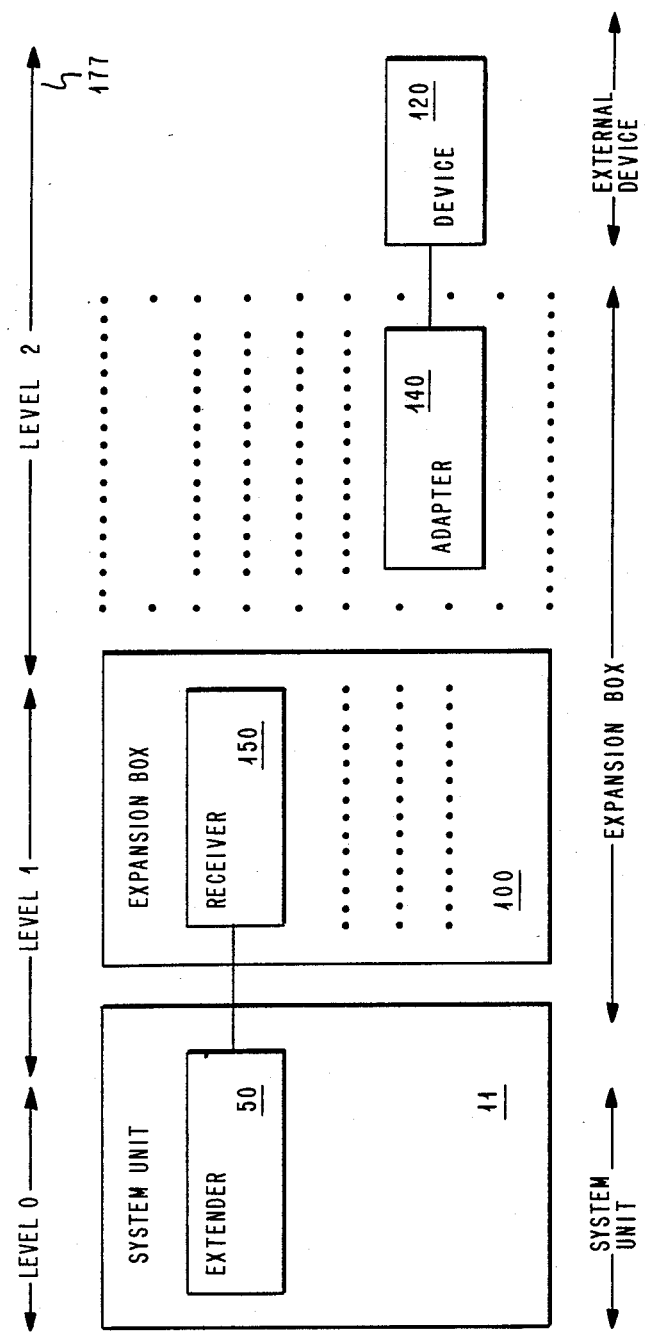

For a system configuration shown in FIG. 3C, the test levels 177 are as shown in FIG. 3D. For example, if the configuration of the processing system had a system unit 11 with an extender 50 for an expansion unit 100, having a receiver 150 and an adapter 140, and an external device 120, the test levels 177 may be defined as shown. The receiver card 150 is included in level 1 because it provides the interface to an expansion unit 100 which provides additional slots for adapters 140. Level 2 is used for the options 130, 140 in the expansion unit 100. The levels are assigned based on the location of the option within the system configuration. The level also indicates an option's dependencies to the other options in the system configuration.

The test levels 177 are placed in the present configuration record 15, as shown in FIG. 5, by the configuration determination modules 14 (FIG. 2). The present configuration record 15 has an entry 161-164 for each option in the system configuration. The information included for each entry includes the name 171 of the option, the type number 172, a service request number 173 associated with the option, and a slot location number 174 from which the option is attached. If the option is located in the system unit, then this value is zero. The slot number 175 identifying where the adapter is located, whether it is in the system unit or an expansion unit, is also included in the information for each entry 161-164. Devices are represented as being attached to adapters, enclosures are represented as being attached to adapters, and adapters and devices are represented as being located in the system unit or in the enclosure. The test level 177 is also stored in the present configuration record 15 for each entry 161-164.

The system checkout component utilizes the test level information 177 for each option in the present configuration record 15 for running a system checkout and for checking for missing options.

Figure 6A:
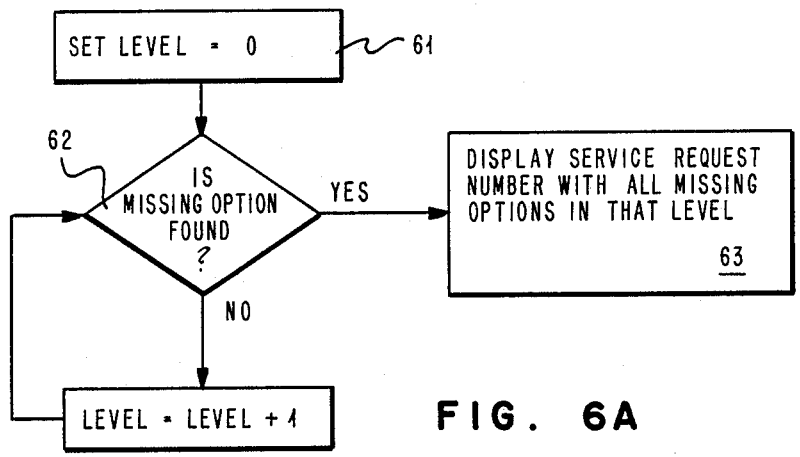
FIG. 6A is a flow diagram showing the use of test levels in checking for missing options.
Figure 6B:
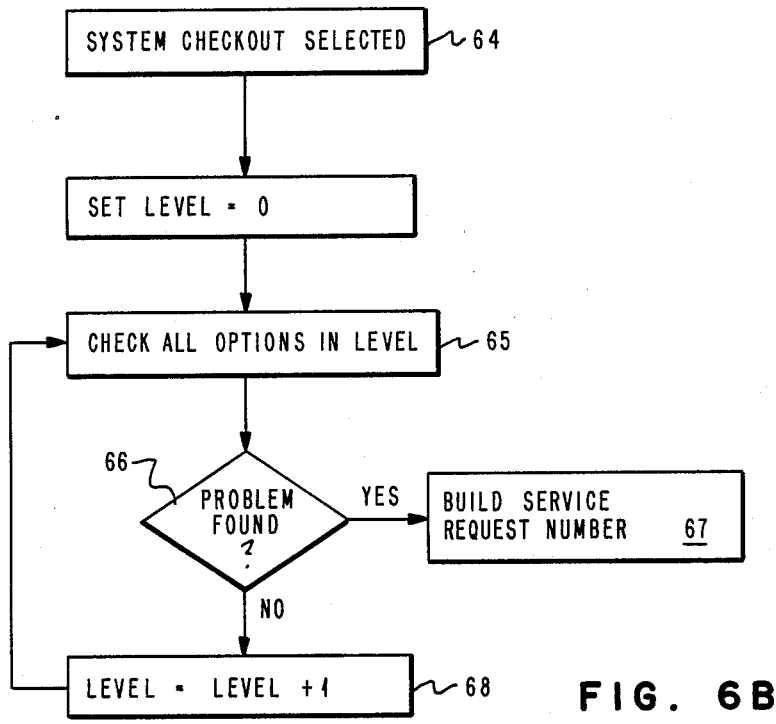
FIG. 6B is a flow diagram showing the use of test levels during a system checkout.

The following discussion with reference to FIG. 6B will describe how the test level information 177 will be used by the system checkout component to determine the order in which options are checked during system checkout. Whenever system checkout is selected, step 64, the system checkout component will check all level 0 options, step 65. After all level 0 options are checked the system checkout component will check to see if any problems were found, step 66. If a problem was found, the system checkout component will stop checking options, and build the service request number based on the current data, step 67. If no problems were found, the system checkout component will continue to the next level, step 68, and check all options at that level, step 65. The system checkout component will proceed through each level until all levels have been checked or a problem within a level is found.

Referring back to FIG. 3C, if the receiver option 150 is found defective during the system checkout, as described above with reference to FIG. 6B, then all of the adapters 140 and devices 130 in the expansion unit 100 will not show up as defective in the present invention even though the receiver option 150 is required to test them. Since the receiver option 150 is at level 1, it will be checked before any of the level 2 adapters 140 and devices 130 in the expansion unit 100. If the receiver option 150 test fails, the system checkout component will not test any of the level 2 options, 140, 130. However, the system checkout component will display a service request number with only the receiver card 150 in it, instead of displaying the receiver card 150 and all options 140, 130 that are likely to fail their test because of a defective receiver card 150.

As shown in FIG. 6A, the system checkout component will check for missing options starting at level 0, step 61. Once a missing option is found in a level, step 62, the system checkout component will not check any other levels for a missing option. Instead the system checkout component will display a service request number with all of the missing options on that level, step 63. However, since a portable option may or may not be present, the system checkout component does not check any options having a test level assigned to portable options. In this way, diagnostics can be run at any time, independent of whether or not the portable option is in the present configuration, without having to continually query the user about the presence of the portable options.

For example, with reference to FIG. 3C, if the receiver 150 is defective and shows up as missing, all of the adapters 140 and devices 130 in the expansion unit 100 will also show up as missing since the receiver option 150 is required to interface to them. Since the receiver option 150 is at level 1, it will be checked for being missing before any of the level 2 adapters 140 and devices 130 in the expansion unit 100. If the user indicates that the receiver option 150 is missing, the system checkout component 10 will not check any of the level 2 options. However, the system checkout component 10 will display a service request number with only the receiver card 150 in it, instead of the receiver card and all of the options 140, 130 in the expansion unit 100 that are also diagnosed as missing.

In addition to defining test levels, the system and method of this invention comprises means for defining prerequisite rule bases through the configuration record 15, FIG. 5. A prerequisite rule base is a rule base that should be run before the selected option rule base is run. For example, with reference to FIG. 3C, if adapter 140 is defective, then there is no need to test device 120, since device 120 is dependent upon adapter 140.

The system checkout component 10 (FIG. 2) determines which prerequisite rule base to run depending upon the information in the present configuration record 15, FIG. 5. As shown in FIG. 5, the area rule base 176 is identified for each option listed as an entry 161-164 in configuration record 15. This area rule base identifier 176 identifies an area rule base to be used in diagnosing the associated option as stored in the rule file 17 (FIG. 2). In addition, prerequisite information 181-184 is listed for each option. This prerequisite information 181-184 includes the slot in the system unit from which a prerequisite option is attached, 181, the slot in which the prerequisite option is attached, 182, the type of the prerequisite option, 183, and the service request number representing the prerequisite option, 184.

For example the RS188 adapter 140 is dependent on the receiver card 150 as indicated by the prerequisite information 181-184 for that entry. The prerequisite information 181-184 for adapter 140 matches the identifying information 172-175 for the receiver card 150. Likewise, the prerequisite information 181-184 for the receiver card 150 matches the identifying information 172 to 175 for the expansion card 50. As shown in FIG. 3C, the receiver card option 150 is dependent upon the expansion card option 50.

Therefore, if the adapter 140 option is selected for checkout, the system checkout component can determine from the prerequisite information 181-184 in the present configuration record 150 which prerequisite rule bases to run. Whenever an option checkout is selected, the system checkout component first checks to see if there is a prerequisite rule base to run for the option. If there is, the system checkout component checks to see if that prerequisite option has a prerequisite rule base. This allows an endless number of options to be chained together and tested in the correct order independent of each other.

This is illustrated in the above example with reference to FIG. 5 and FIG. 3C. From this example, the rule base DR6400 will be run for the expansion card option 50, then the rule base identified by DR6800 for the receiver card option 150, then the rule base identified by DR3800 for the adapter option 140, in this order as listed.

Since the prerequisite rule bases are chained together through the present configuration record 15, and accessed by the system checkout component, each individual area rule base for each separate option does not have to include additional rules based on the possible dependencies of an option within any given system configuration. Therefore, each area rule base can be more simply written by containing only those rules necessary to test an option independent of its location within the configuration.

Figure 7:
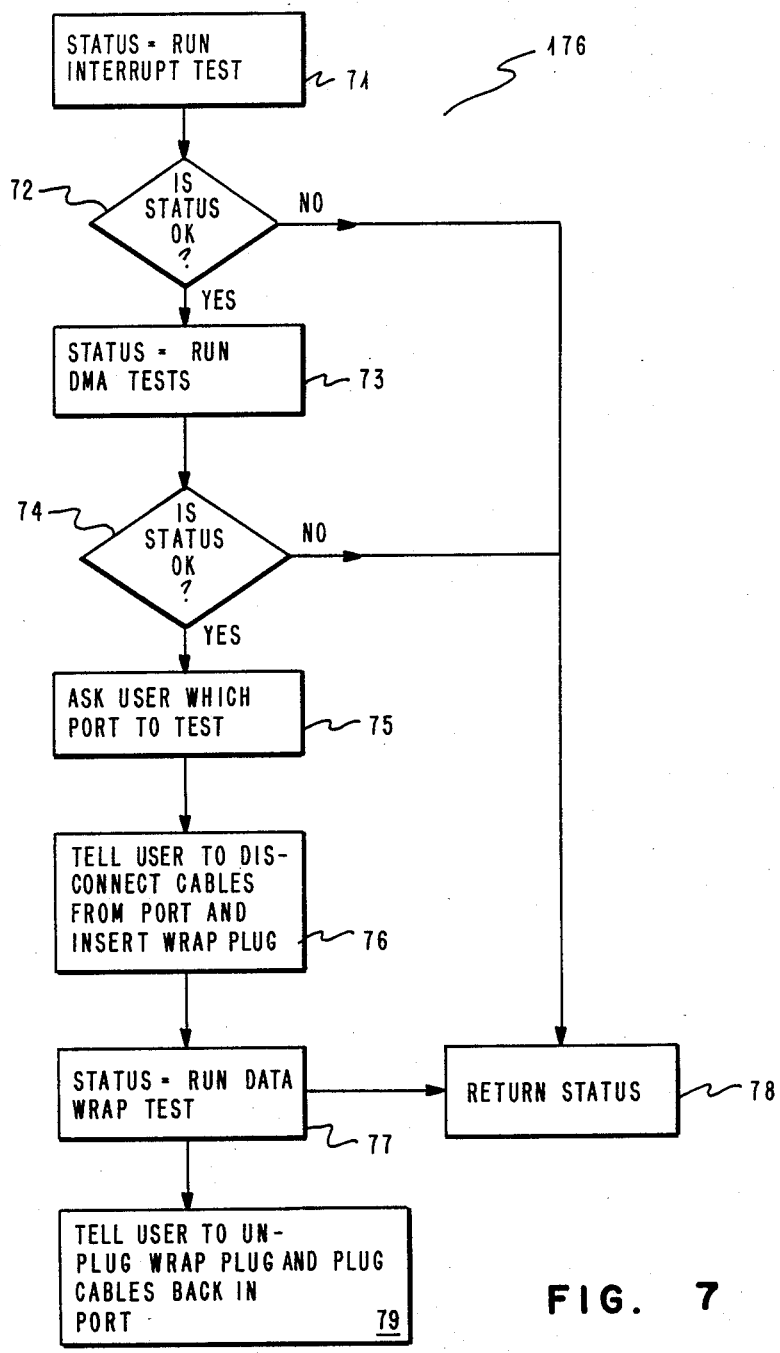
FIG. 7 is a flow diagram for a location independent rule base.

For example, the flow diagram of FIG. 7 illustrates the logic for a location independent rule base 176 such as for a sample card listed as adapter 140. The rule base comprises tests such as the run interrupt test, 71, and the DMA test 73. If any of these tests fail, the status of the adapter is returned as a failed option, step 78. If these location independent tests pass, then the user is asked which port of the 8-port adapter the user would like to test next, step 75. The user is then instructed to remove the cables from the port the user identified, and to insert the wrap plug for further testing, step 76. The data wrap test is then run, step 77. The status is then returned, step 78, and the user is instructed to unplug the wrap plug and reinsert the cables, step 79. No logic in the rule base 176 is needed concerning the receiver card 150 on which the adapter 140 depends.

The prerequisite rule base information discussed above is put into the present configuration record 15, by the configuration determination modules 14 (FIG. 2). The configuration determination modules 14 determine if a prerequisite rule base is needed by looking at the location of the selected option.

The system checkout component makes use of both the test level designations and the prerequisite rule bases when it is resolving the disappearance of options. The two classification schemes complement each other. The underlying assumption is that the prerequisite rule base information identifies all of the lower level options on which an option is dependent. The missing option resolution proceeds along test levels verifying the configuration in layers. As each layer is verified, it can be tested.

For example, if a level 2 device 130 (FIG. 3C) disappears, its prerequisite hardware can be tested because the configuration has already been verified for level 0 and level 1. If the user indicates that the device 130 is missing, then the system will automatically test the extender card 50, the receiver card 150, and finally the adapter 140, before calling out the missing device 130. If one of these antecedent options 50, 150, 140 is defective, it may show up in the configuration, and another option which is dependent on one of the antecedent options 50, 150, 140 may appear to malfunction. Therefore, the service request number of the defective antecedent option is called out, and not the service request number of the device 130. In resolving the disappearance of hardware options, the smallest number of service request numbers should be returned to a user in order to isolate the hardware failure.

In implementing the resolution of missing options, some non volatile memory is needed, such as a reserved portion of a hard file. The past configuration record is stored in this reserved area. A power on self test (POST) and loadable POST (LPOST) are used to perform a presence test for each adapter and device supported in the configuration. The configuration determination modules then create the current configuration information.

A multi function card is a card that contains more than one adapter. Each adapter is listed separately in the current configuration information. Each adapter also has its own presence tests.

The test levels which are assigned to each option in the configuration, are used to order the resolution of missing options.

Figure 4:
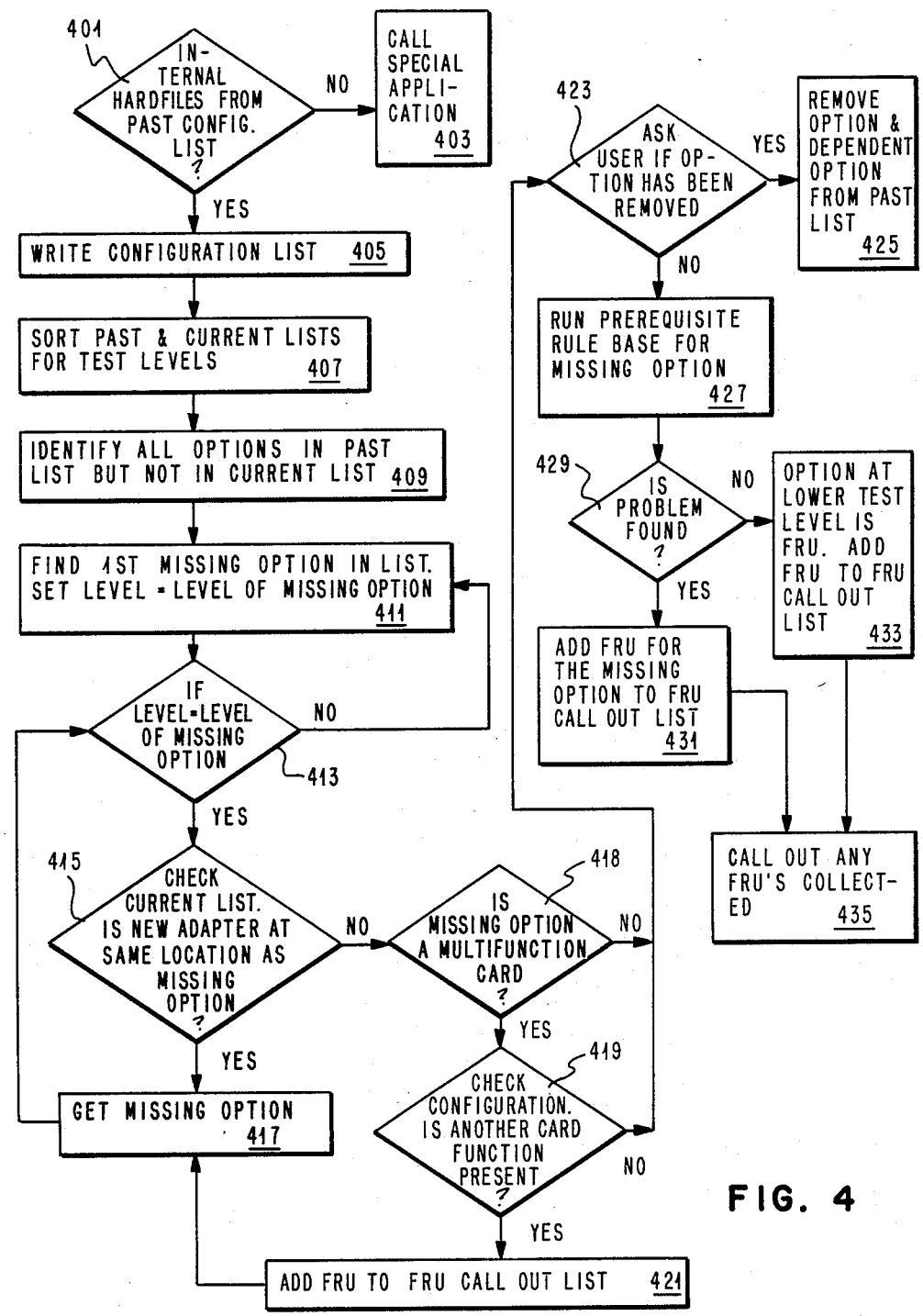
FIG. 4 is a flow diagram illustrating the steps utilized in resolving a missing option.

In reference to FIG. 4, the system and method of this invention for resolving missing options will be described as follows.

The current configuration, which was created based on the information generated from the presence tests prior to the execution of this procedure, and stored in system memory, is read. If there are no internal hard files and thus no past configuration list, step 401, a special application will be called, step 403. This special application will ask the user if there should be a fixed disk installed in the system. If the user responds that there should be, then a problem report with a service request number for the fixed disk is generated. If the user responds that a fixed disk is not attached, then this procedure is aborted. In the preferred embodiment of this invention, a fixed disk is needed to obtain the past configuration record.

The configuration list is written only to internal hard files since external hard files are portable, and may not be attached to the system, step 405. In addition, portable hard files may have been attached to a different system configuration, and thus the configuration recorded on them may not be relevant to the current system.

The past configuration list is read, and compared with the current configuration list. The past configuration list and the current configuration list are sorted according to test level, step 407. All adapters are placed before the corresponding attached devices. Any of the options from the past configuration list that are not found in the current configuration list are identified, step 409. These options constitute the entire set of missing options.

The first missing option in the list is found, and the current test level is set to the test level of that missing option, step 411. If the current test level is the same as the test level of the missing option, step 413, the following steps occur. The current configuration is checked to see if a new adapter has been added to the system in the same location that previously held the missing option, step 415. If a new adapter has been added, any options that were dependent on the option, as determined from the prerequisite information in the configuration list, that were previously installed, are deleted from the missing option list. Thus, if the user reconfigures the system so that an option is no longer part of the system, the system checkout component will not ask the user if each dependent option had been removed. After deleting the dependent options from the missing option list, the next missing option that was in the past configuration list and not the current configuration list is found, step 417, and the step of checking the current test level with the missing option test level, step 413, is repeated.

For every missing option that is a multi function card, step 418, the configuration is checked to determine if another function of that card is present, step 419. If another function of the card is present, the multi function card is listed as a field replaceable unit on the FRU call out list, step 421. Multi function cards that are added on the call out list are exempt from the rest of this process.

The next missing option is found, step 417, and the step of comparing the current test level with the test level of the missing option, step 413, is repeated.

If the missing option is not a multi function card, and/or another function of the card is not present, the user is asked if the option has been removed from the system, step 423. If the option has been removed from the system, then the option and any options that are dependent upon it from the past configuration list are removed, step 425. For example, if the user removed an adapter, then the adapter, and any devices attachable to the adapter, are deleted from the configuration list. The prerequisite rule base list for the other missing options should identify the dependent options.

If the option has not been removed from the system, the prerequisite rule base for the missing option is run, step 427. If no problem is found with the antecedent options, step 429, the missing option is added to the field replacement call out list, step 431. Otherwise, the field replacement unit is associated with the antecedent option at a lower test level, step 433. All FRU's collected are then called out, step 435.

As described above in reference to the preferred embodiment, the diagnostic system of this invention assigns test levels to options based on the dependency of the options to other options within a system configuration, and stores the test level information for each option in the present configuration list. Any prerequisite rule bases are linked to an option through the present configuration list, and not through the area rule base associated with that option. This allows each option to have simplified rule bases that are independent of the options' location within the system configuration.

The diagnostic system of this invention utilizes both the test level information and the prerequisite rule base information during the resolution of missing options. All options not listed in the present configuration list which are listed in the past configuration list comprise the set of missing options. The first missing option at the lowest test level is checked first. If a new adapter has been added to the system configuration at the same location as the missing option, then the missing option and all options dependent from the missing option, as determined from the prerequisite information stored in the configuration list, are deleted from the set of missing options and are not later tested. If a new option has not been added in place of the missing option, the options antecedent to the missing option are tested first, in order, as determined by the prerequisite rule base information stored for each option. The service request number of any antecedent option found to malfunction or to cause the missing option to disappear is used to identify and isolate the failing hardware. If no antecedent option is found faulty, the service request number of the missing option is used to identify and isolate the failing option.

During a system checkout, only the test level information stored in the present configuration record is used to determine the order in which the options are verified. After all options in a lower level are verified, the options in a next higher level are verified. The level verification ends when an option at a level fails. The service request number for this failed option is then used to identify and isolate the failed option.

During an option checkout, only the prerequisite rule base information is the present configuration record is accessed and used to determine which other options should be checked, and the order in which the other options are to be checked, before the selected option is checked. If a prerequisite option fails during the selected option checkout, the service request number of the prerequisite option is used to identify and isolate the failed option.

Although the foregoing invention has been particularly shown and described with reference to the preferred embodiments thereof, it will be understood by those skilled in the art that other changes in form may be made without departing from the scope of the claims.

We claim:

1. A system for running diagnostics on a processing system having a plurality of attachable options, said system comprising:

means for defining a plurality of test levels for a configuration of said processing system;

means for assigning one of said test levels to each one of said options based on the dependency of said each option to other of said options in said configuration; and means for checking the plurality of options in an order determined by the test level assignment of each of said options during a system checkout of said processing system.

2. The system of claim 1 wherein a first test level is assigned to said options within a system unit of said processing system.

3. The system of claim 2 wherein a second test level is assigned to said options that are immediately dependent upon said first test level options.

4. The system of claim 3 wherein a third test level is assigned to said options that are immediately dependent upon said second test level options.

5. The system of claim 1 further comprising means for identifying a failed option during said system checkout at the test level of said failed option.

6. A system for running diagnostics on a processing system having a plurality of attachable options, said system comprising:

a configuration list having an entry for each of said options in a present configuration of said processing system;

means for identifying, in said configuration list, a hierarchy of dependent options in said present configuration; and means for accessing said identified hierarchy for determining an order in checking at least one option antecedent to a selected option during a checkout of said selected option.

7. A system for running diagnostics on a processing system having a plurality of attachable options, said system comprising:

a configuration list having an entry for each of said options in a present configuration of said processing system;

means for linking, in said configuration list, a prerequisite rule base for each of said options dependent upon another option in said present configuration; and means for accessing said linked prerequisite rule base for determining an order in checking at least one option antecedent to a selected option during a checkout of said selected option.

8. A system for running diagnostics on a processing system having a plurality of attachable options, said system comprising:

a configuration list having an entry for each of said options in a present configuration of said processing system;

means for identifying, in said configuration list, a location independent rule base for each of said options; and means for linking, in said configuration list, said location independent rule base of each option to a dependent option of said each option.

9. A system for running diagnostics on a processing system having a plurality of attachable options, said system comprising:

a configuration list having an entry for each of said options in a present configuration of said processing system;

means for assigning one of a plurality of test levels to each of said options in said configuration list; and means for linking, in said configuration list, a plurality of prerequisite rule bases in an order representing a dependency of an option to other of said options in said configuration of said processing system.

10. A system for running diagnostics on a processing system having a plurality of attachable options, said system comprising:

a configuration list having an entry for each of said options in a present configuration of said processing system;

means for assigning one of a plurality of test levels to each of said options in said configuration list;

means for linking, in said configuration list, a plurality of prerequisite rule bases in an order representing a dependency of an option to other of said options in said configuration of said processing system; and means for utilizing said test level assignment and said linked prerequisite rule base during a resolution of a missing option.

11. A system for isolating a failed option in a present configuration of a processing system, said system comprising:

a configuration list having an entry for each of said options;

means for identifying a test level for each of said options in said configuration list;

means for identifying a prerequisite rule base for each of said options in said configuration list; and means for resolving a missing option from said present configuration based on said test level identified and prerequisite rule base identified in said configuration list.

12. A method for running diagnostics on a processing system having a plurality of attachable options, said method comprising:

defining a plurality of test levels for a configuration of said processing system;

assigning one of said test levels to each one of said options based on the dependency of said each option to other of said options in said configuration; and checking the plurality of options in an order determined by the test level assignment of each of said options during a system checkout of said processing system.

13. The method of claim 12 further comprising the step of identifying a failed option during said system checkout at the test level of said failed option.

14. A method for running diagnostics on a processing system having a plurality of attachable options, said method comprising:

identifying, in a configuration list, a hierarchy of dependent options in said present configuration; and accessing said identified hierarchy for determining an order in checking at least one option antecedent to a selected option during a checkout of said selected option.

15. A method for running diagnostics on a processing system having a plurality of attachable options, said method comprising:

linking, in a configuration list, a prerequisite rule base for each of said options dependent upon another option in said present configuration; and accessing said linked prerequisite rule base for determining an order in checking at least one option antecedent to a selected option during a checkout of said selected option.

16. A method for running diagnostics on a processing system having a plurality of attachable options, said method comprising:
identifying, in a configuration list, a location independent rule base for each of said options; and
linking, in said configuration list, said location independent rule base of each option to a dependent option of said each option.

17. A method for running diagnostics on a processing system having a plurality of attachable options, said method comprising:
assigning one of a plurality of test levels to each of said options in a configuration list; and
linking, in said configuration list, a plurality of prerequisite rule bases in an order representing a dependency of an option to other of said options in said configuration of said processing system.

18. A method for running diagnostics on a processing system having a plurality of attachable options, said method comprising:
assigning one of a plurality of test levels to each of said options in a configuration list;
linking, in said configuration list, a plurality of prerequisite rule bases in an order representing a dependency of an option to other of said options in said configuration of said processing system; and
utilizing said test level assignment and said linked prerequisite rule base during a resolution of a missing option.

19. A method for isolating a failed option in a present configuration of a processing system, said method comprising:
identifying a test level for each of said options in a configuration list;
identifying a prerequisite rule base for each of said options in said configuration list; and
resolving a missing option from said present configuration based on said test level identified and prerequisite rule base identified in said configuration list.

20. A method for isolating a failed option in a present configuration of a data processing system, said method comprising:
comparing a past configuration list to a present configuration to determine a set of options missing from a present configuration of said processing system;
assigning one of a plurality of test levels to each of a plurality of options in said data processing system;
identifying a hierarchy of dependent options in a configuration of said processing system;
identifying a first missing option having a lowest test level; and
deleting, from said set of missing options, said first missing option and said identified hierarchy of dependent options of said first missing option if another option has replaced said first missing option in a same location within said configuration.

21. A method for isolating a failed option in a present configuration of a data processing system, said method comprising:
comparing a past configuration list to a present configuration to determine a set of options missing from a present configuration of said processing system;
assigning one of a plurality of test levels to each of a plurality of options in said data processing system;
identifying a hierarchy of dependent options in a configuration of said processing system;
identifying a first missing option having a lowest test level;
testing at least one antecedent option, in an order determined by said hierarchy of dependent options; and
identifying said antecedent option which fails said test as said failed option.

22. A method for isolating a failed option in a present configuration of a data processing system, said method comprising:
comparing a past configuration list to a present configuration to determine a set of options missing from a present configuration of said processing system;
assigning one of a plurality of test levels to each of a plurality of options in said data processing system;
identifying a hierarchy of dependent options in a configuration of said processing system;
identifying a first missing option having a lowest test level;
testing at least one antecedent option, in an order determined by said hierarchy of dependent options; and
identifying said first missing option as said failing option if each of said antecedent options passes said test.

23. A method of testing a configuration of a data processing system having a plurality of options, said method comprising:
classifying the configuration into a plurality of test levels depending upon the location of the options within the processing system, and the dependency of each of said options to other of said options; and
testing options classified within a lower level before testing options classified within a next higher level;
defining a prerequisite rule base for each of said options; and
testing a plurality of options in an order as determined by said test level and said prerequisite rule base of each of said plurality of options.

24. The method of claim 23 further comprising the step of halting the test at a current test level if an option at the current test level fails, and displaying an indicator of said failed option.

* * * * *